Patented Dec. 2, 1952

2,620,327

UNITED STATES PATENT OFFICE 2,620,327

POLYAMIDES AND THEIR PREPARATION

Charles J. Albisetti, Jr., Wilmington, Del., assignor to E. I. du Pont de Nemours & Company, Wilmington, Del., a corporation of Delaware No Drawing. Application March 13, 1950,
Serial No. 149,453

14 Claims. (Cl. 260—78)

This invention relates to new polymeric materials and more particularly to new polyamides and to a method for their preparation.

The condensation between nitriles and olefins in aqueous acidic media to form amides has been described (Ritter and Minieri, J. Am. Chem. Soc. 70, 4045 (1948)). Extension of this reaction to the preparation of polyamides by the condensation of dinitriles with ditertiary olefins has also been described (copending application Ser. No. 72,775, filed January 5, 1949, by Magat). In view of the facts that delta-aminovaleric acid on heating gives no polyamide (U. S. Patent 2,071,253) but only delta-valerolactam (Schotten, Ber. 21, 2240 (1888)), and that delta-valerolactam itself has not been polymerized by methods (U. S. Patents 2,241,322 and 2,251,519) which convert its homolog, epsiloncaprolactam, to a polyamide, it was to be expected that the condensation of an olefinic nitrile in which the double bond and the nitrile groups are separated by three carbon atoms should proceed to give exclusively the cyclic lactam. Surprisingly, it has now been found that cyclic lactams are not produced, but that polyamides are formed.

It is an object of this invention to prepare new polymeric materials and to provide a novel process for their preparation. A further object is to provide novel polyamides and a process for their preparation by condensation of certain selected acyclic mono-unsaturated mononitriles in which the carbon atom containing the ethylenic double bond and the nitrile group are separated by three carbon atoms. Other objects will appear hereinafter.

These objects are accomplished by the following invention, which comprises condensing in strong acidic media an acylic mono-unsaturated mononitrile in which the unsaturation is ethylenic and in the 5-position and which has an alkyl or aralkyl substituent in the 5-position. The novel products of this invention are polyamides resulting from the self-condensation of at least two molecules of the above-defined unsaturated nitriles. These products have a plurality of amide groups and contain the structural unit:

(I) 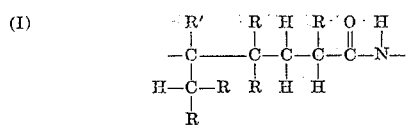

wherein R represents a hydrogen atom or an alkyl group and R' represents an alkyl or aralkyl group. The dimeric polyamides resulting from the condensation of two molecules of the unsaturated nitriles have the formula:

(II) 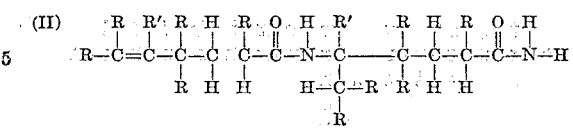

wherein R represents a hydrogen atom or an alkyl group and R' represents an alkyl or aralkyl group. The polymeric polyamides resulting from the condensation of three or more molecules of the unsaturated nitrile contain a plurality of structural units (the recurring structural unit) of Formula I. Especially preferred embodiments of this invention are polyamides containing this structural unit in which R' is an alkyl or aralkyl group of not more than 7 carbon atoms, and preferably is an alkyl group of from 1 to 5 carbon atoms, and where R is hydrogen or an alkyl group of not more than 3 carbon atoms, and preferably hydrogen or methyl.

The unsaturated nitriles used in the process of this invention have the general formula:

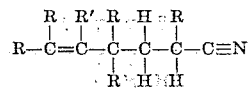

wherein R represents a hydrogen atom or an alkyl group and R' represents an alkyl or an aralkyl group. Preferred mononitriles for use in this invention have this general formula in which R represents a hydrogen atom or an alkyl group of not more than 3 carbon atoms and preferably hydrogen or methyl and wherein R' represents an alkyl or aralkyl group of not more than 7 carbon atoms and preferably an alkyl group of from 1 to 5 carbon atoms.

The new polymers of this invention are conveniently prepared by contacting one mole of an acyclic mono-unsaturated mononitrile having at least seven carbon atoms, in which the unsaturation is ethylenic and in the 5-position, and which has an alkyl or aralkyl group in the 5-position, e. g., 5-methyl-5-hexenenitrile, with from three to four moles of strong sulfuric acid, e. g., sulfuric acid of 65 to 85% and preferably from 72 to 80% concentration, at a temperature between —10° C. and 30° C. and preferably at about 0° C.

The sulfuric acid is usually aqueous acid of these concentrations, but it can be diluted with organic acids such as acetic acid instead of water. For example, a mixture of 72% H₂SO₄ and 28% glacial acetic acid can be substituted for 72% aqueous sulfuric acid.

The unsaturated nitrile can be added to the sulfuric acid at the specified temperature, or if desired, the acid can be added to the nitrile. In either case it is essential that the rate of addition of one reactant to the other be controlled carefully so as to maintain the temperature of the resulting mixture within the above-specified range, since the reaction is exothermic. The actual rate of addition depends, of course, on the effectiveness of the cooling means employed. After the addition of reactants is finished, the reaction mixture is allowed to stand for a short time to complete the reaction. A period of time ranging from one-half to four or five hours is generally sufficient, although longer times, e. g., up to several days, are not harmful.

The resulting reaction mixture is poured into an excess of cold water or onto ice and any unreacted nitrile present separates as an insoluble oil which can be recovered by conventional means. The aqueous solution is made alkaline with an aqueous solution of an alkali metal hydroxide or carbonate, e. g. sodium or potassium hydroxide, or sodium carbonate, or with ammonia, and the organic material is isolated by extraction with an organic solvent such as chloroform or diethyl ether.

Aromatic hydrocarbons such as benzene are solvents for the dimer but they do not dissolve appreciable quantities of higher polymers. The organic solvent extract is dried by conventional means, e. g. by a desiccant such as anhydrous sodium sulfate, and the solvent removed by evaporation or distillation. The lower molecular weight polymers such as the dimers and trimers can be isolated by distillation and the higher polymers are left as non-volatile residues. When the reaction product is principally a solid polymer it can be separated directly from the reaction mixture after addition of an alkali metal carbonate without further isolation steps.

The invention is illustrated in further detail by the following examples in which the proportions of the ingredients are expressed in parts by weight unless otherwise noted.

*Example 1*

To a cold (5° C.) stirred mixture of 206 parts of concentrated sulfuric acid (95.5% minimum $H_2SO_4$) and 88 parts of water is slowly added 66 parts of 5-methyl-5-hexenenitrile. After addition is complete the mixture is allowed to stand at room temperature for two days, then poured into 3000 parts of cold water and made alkaline with concentrated aqueous sodium hydroxide solution. The reaction mixture is extracted with chloroform, and the chloroform extract separated, dried over anhydrous sodium sulfate, and distilled. After removal of chloroform there are obtained 5-methyl-5-hexeneamide, a higher boiling viscous liquid, a solid which distills at 180–240° C./1 mm., and, as a non-volatile residue, a yellow, hard clear resin which is a polyamide having the recurring unit

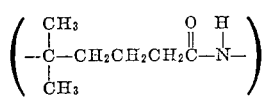

On repetition of this experiment there is obtained 7.0 parts of the distillable solid, which is the dimeric amide having the formula

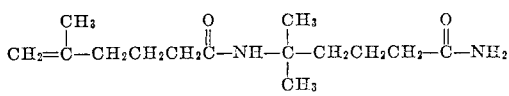

This dimer boils at 185–200° C. at 0.15 mm., is insoluble in water and reacts with potassium permanganate. It has a melting point of 126–129° C. when recrystallized from ethyl acetate.

Anal. calc'd for $C_{14}H_{26}O_2N_2$: C, 66.2%; H, 10.23%; N, 11.09%. Found: C, 66.0%; H, 10.32%; N, 11.19%.

The structure of this compound is confirmed by infrared spectra showing the presence of the following groups:

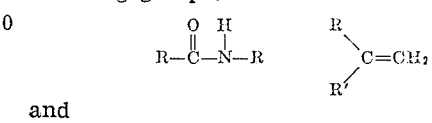

and

wherein R and R' are alkyl groups.

*Example II*

To a cold (0–2° C.) stirred mixture of 25 parts of glacial acetic acid and 27 parts of 5-methyl-5-hexenenitrile is added dropwise during four hours a mixture of 24.5 parts of water and 73.5 parts of concentrated (95.5% minimum $H_2SO_4$) sulfuric acid. After the addition of the sulfuric acid is completed, the mixture is held at a temperature of 2° C. overnight with stirring continued during the entire time. The resulting reaction mixture is poured onto 300 parts of ice and then neutralized with aqueous sodium carbonate solution whereupon a white sticky resin separates which is a polyamide having the recurring unit as set forth in Example I. After drying, this polyamide has a sticking point of 70° C. and melting point of about 145° C. The polymer is soluble in hot ethanol, but is insoluble in benzene. It has a molecular weight of 860, determined by boiling point elevation in ethanol.

Anal. calc'd for $(C_7H_{13}ON)x$: N, 11.03%. Found: N, 11.11%.

*Example III*

To a cold (2° C.) stirred mixture of 34 parts of concentrated sulfuric acid and 12 parts of water (aqueous sulfuric acid of 71% concentration) is slowly added 16.5 parts of 5-methylene-7,7-dimethyloctanenitrile. After the addition is complete the mixture is allowed to stand for 2 hours and then poured into cold water and made alkaline with sodium carbonate. The reaction mixture is extracted with chloroform, and the chloroform extract separated, dried over anhydrous sodium sulfate, and distilled. In addition to recovered nitrile, there is obtained 4 parts of the dimeric amide,

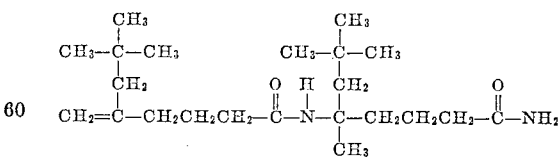

B. P. 170–190° C./0.3 mm., and, as a nonvolatile residue, 3 parts of a red, hard polyamide having the recurring unit

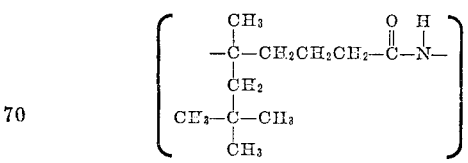

*Example IV*

To a cold (5° C.) stirred mixture of 17 parts of concentrated (95.5% minimum $H_2SO_4$) sulfuric acid and 6 parts of water is slowly added 7.5 parts of 2,4,4,5-tetramethyl-5-hexenenitrile (prepared from tetramethylethylene and methacrylonitrile). After continuing the reaction and working up the reaction mixture by the process of Example III, there are obtained 2.5 parts of material boiling at 80-180° C./0.7 mm., 1.5 parts of dimeric amide, boiling at 180-210° C./0.7 mm., and as a nondistillable residue, 2.5 parts of a clear, yellow, solid polyamide having the recurring unit

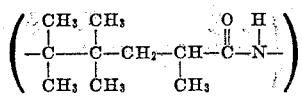

This polyamide when fused can be manually spun to a fiber.

*Example V*

Five parts of 5-benzyl-5-hexenenitrile is added slowly to 22 parts of 85% aqueous sulfuric acid at a temperature of about 0° C. and the mixture held at this temperature for about 2½ hours. The reaction mixture is then poured onto ice and a noncrystallizable solid separates out. This polymer contains no unsaturation as evidenced by a negative permanganate test and has the recurring unit

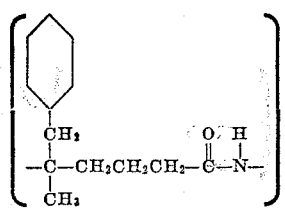

This polyamide has a sticking point of 100° C., a fusion point of 140-150° C., is soluble in acetone but is insoluble in benzene, and contains 5.9% nitrogen. The polymer when fused can be manually spun to a fiber.

The examples have illustrated the polymers of this invention and their preparation by reference to the condensation of four specific nitriles. However, any acyclic monounsaturated mononitrile in which the unsaturation is ethylenic and is in the 5-position and which has an alkyl or aralkyl substituent also in the 5-position can be employed in the process of this invention. Examples of other operable mononitriles include 5-ethyl-5-hexenenitrile, 2,5-dimethyl-5-hexenenitrile, and 5-methylene-2,7,7-trimethyloctanenitrile. The polymers formed from these particular nitriles have the following respective formulas (in which $n$ represents a positive integer greater than 1):

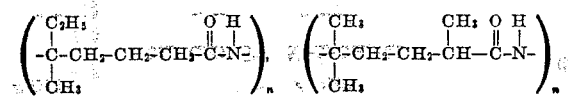

and

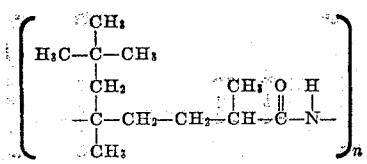

In addition to sulfuric acid, other strong acids can be used to polymerize acyclic monounsaturated mononitriles by the process of this invention. For example, formic acid, phosphoric acid and alkanesulfonic acids are useful for this purpose.

The acyclic monoethylenically unsaturated mononitriles used as starting materials for the polymers of this invention can be prepared by the thermal addition of an alpha, beta-ethylenically unsaturated mononitrile to a neutral olefinic compound free of non-conjugated unsaturation having an acyclic olefinic double bond and having adjacent to one of the doubly bonded carbons a carbon atom having attached thereto at least one hydrogen atom. This process is described in detail in U. S. patent application, Serial No. 101,905, filed June 28, 1949, by C. J. Albisetti and N. G. Fisher, now abandoned, of which application Ser. No. 168,387, filed June 15, 1950, is a continuation.

The polymers of this invention have a wide range of molecular weights and are useful in many different applications. The lower molecular weight polymers, i. e. the dimers and trimers, are useful as nonvolatile plasticizers and modifiers for natural and synthetic resins. The higher molecular weight polymers are useful in the formation of fibers and coating compositions and as textile treating agents.

As many apparently widely different embodiments of this invention may be made without departing from the spirit and scope thereof, it is to be understood that this invention is not limited to the specific embodiments thereof except as defined in the appended claims.

I claim:

1. A polyamide containing a plurality of structural units and as the sole recurring unit, the structural unit having the formula:

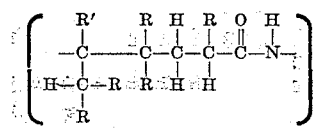

wherein R is selected from the group consisting of alkyl of not more than 3 carbon atoms and hydrogen and R' is selected from the group consisting of alkyl and aralkyl.

2. A polyamide containing a plurality of structural units and as the sole recurring unit, the structural unit having the formula:

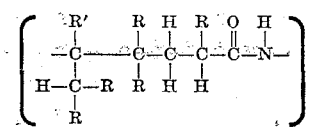

wherein R is methyl and R' is an alkyl group of from 1 to 5 carbon atoms.

3. A polyamide containing a plurality of structural units and as the sole recurring unit, the structural unit having the formula:

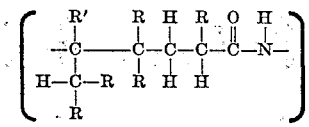

wherein R is methyl and R' is an aralkyl group.

4. A polyamide containing a plurality of structural units and as the sole recurring unit, the structural unit having the formula:

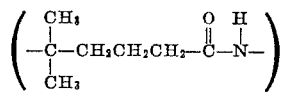

5. A polyamide containing a plurality of structural units and as the sole recurring unit, the structural unit having the formula:

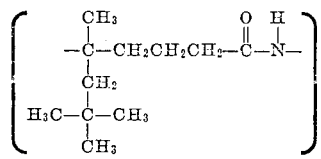

6. A polyamide containing a plurality of structural units and as the sole recurring unit, the structural unit having the formula:

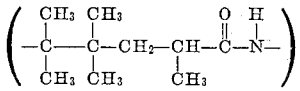

7. A polyamide containing a plurality of structural units and as the sole recurring unit, the structural unit having the formula:

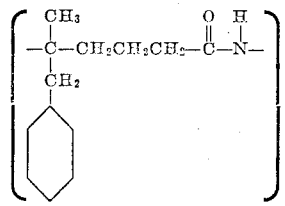

8. A polyamide containing a plurality of structural units and as the sole recurring unit, the structural unit having the formula:

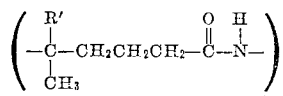

wherein R' is an alkyl group of from 1 to 5 carbon atoms.

9. A polyamide containing a plurality of structural units and as the sole recurring unit, the structural unit having the formula:

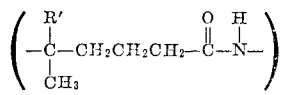

wherein R' is an aralkyl group.

10. A polyamide having a plurality of amide groups and consisting of the structural units

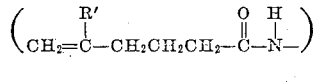

and

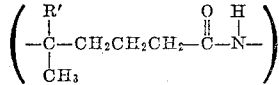

wherein R' is alkyl and the first structural unit is a terminal structural unit.

11. A polyamide having a plurality of amide groups and consisting of the structural units

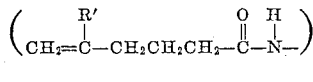

and

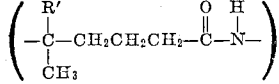

wherein R' is aralkyl and the first structural unit is a terminal structural unit.

12. A polyamide having a plurality of amide groups and consisting of the structural units

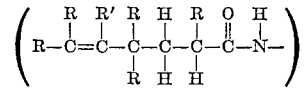

and

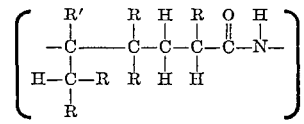

wherein R is alkyl of not more than 3 carbon atoms and R' is alkyl and the first structural unit is a terminal structural unit.

13. A polyamide having a plurality of amide groups and consisting of the structural units

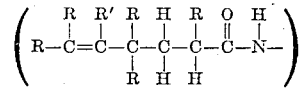

and

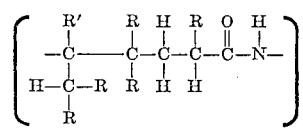

wherein R is alkyl of not more than 3 carbon atoms and R' is aralkyl and the first structural unit is a terminal structural unit.

14. A polyamide having a plurality of amide groups and consisting of the structural units

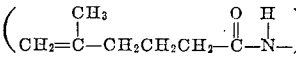

and

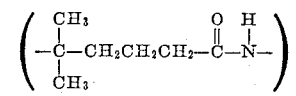

wherein the first structural unit is a terminal structural unit.

CHARLES J. ALBISETTI, Jr.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,162,971 | Ralston | June 20, 1939 |
| 2,293,388 | Hanford | Aug. 18, 1942 |
| 2,356,516 | Hagedorn | Aug. 22, 1944 |
| 2,573,673 | Ritter | Oct. 30, 1951 |